US012007361B2

(12) United States Patent
Raja et al.

(10) Patent No.: US 12,007,361 B2
(45) Date of Patent: Jun. 11, 2024

(54) DEVICES AND METHODS OF SENSING PROPERTIES OF FLUIDS

(71) Applicant: Indian Institute of Technology Madras (IIT Madras), Chennai (IN)

(72) Inventors: Nishanth Raja, Chennai (IN); Krishnan Balasubramanian, Chennai (IN)

(73) Assignee: Indian Institute of Technology Madras (IIT Madras), Chennai (IN)

( * ) Notice: Subject to any disclaimer, the term of this patent is extended or adjusted under 35 U.S.C. 154(b) by 408 days.

(21) Appl. No.: 17/281,485

(22) PCT Filed: Oct. 10, 2019

(86) PCT No.: PCT/IN2019/050795
§ 371 (c)(1),
(2) Date: Mar. 30, 2021

(87) PCT Pub. No.: WO2020/100157
PCT Pub. Date: May 22, 2020

(65) Prior Publication Data
US 2021/0404990 A1    Dec. 30, 2021

(51) Int. Cl.
*G01N 29/032* (2006.01)
*G01N 29/06* (2006.01)
*G01N 29/24* (2006.01)

(52) U.S. Cl.
CPC ....... *G01N 29/032* (2013.01); *G01N 29/0645* (2013.01); *G01N 29/2462* (2013.01);
(Continued)

(58) Field of Classification Search
CPC ............. G01N 29/032; G01N 29/0645; G01N 29/2462; G01N 29/4427; G01N 29/024;
(Continued)

(56) References Cited

U.S. PATENT DOCUMENTS 9,297,789 B2    3/2016    Djordjevic et al.
2014/0331785 A1   11/2014   Ao et al.
(Continued)

OTHER PUBLICATIONS

Cegla, F. B. et al., "Fluid bulk velocity and attenuation measurements in non-Newtonian liquids using a dipstick sensor", Measurement Science and Technology, (Feb. 1, 2006), vol. 17, No. 2, doi:10.1088/0957-0233/17/2/006, pp. 264-274, XP020103373.
(Continued)

*Primary Examiner* — Suman K Nath
(74) *Attorney, Agent, or Firm* — Convergence Intellectual Property Law P.C; Jonathan Garfinkel

(57) ABSTRACT

The invention discloses methods for simultaneously measuring various properties of a fluid using a waveguide. The method includes transmitting a plurality of wave modes into the fluid using an ultrasonic shear wave transducer from one end of a waveguide. Further, the wave modes are reflected from the other end of the waveguide. The reflected wave modes are processed simultaneously. The time of flight and the amplitude of the received wave modes are determined. Further, one or more properties of the fluid are measured using determined time of flight and amplitude of the received wave modes. The disclosed method is used to accurately measure the properties of fluid such as level, density, viscosity or flow rate in a short period of time.

12 Claims, 12 Drawing Sheets

(52) U.S. Cl.
CPC .............. *G01N 2291/02818* (2013.01); *G01N 2291/02836* (2013.01); *G01N 2291/02881* (2013.01)

(58) Field of Classification Search
CPC .......... G01N 2291/02818; G01N 2291/02836; G01N 2291/02881; G01N 2291/0426; G01N 2291/0427; G01F 1/662; G01F 23/2962; G01K 11/24
See application file for complete search history.

(56) References Cited

U.S. PATENT DOCUMENTS

| | | | |
|---|---|---|---|
| 2016/0153938 A1 | 6/2016 | Balasubramaniam et al. | |
| 2018/0348035 A1* | 12/2018 | Huang | G01F 23/26 |
| 2020/0088686 A1* | 3/2020 | Sinha | G01N 29/032 |

OTHER PUBLICATIONS

International search report and written opinion for application No. PCT/IN2019/050795 dated Feb. 14, 2020, 10 pages.

\* cited by examiner

DEVICES AND METHODS OF SENSING PROPERTIES OF FLUIDS

CROSS-REFERENCES TO RELATED APPLICATIONS

This application is a US National Phase filing of PCT/IN2019/050795 entitled "DEVICES AND METHODS OF SENSING MULTIPLE PROPERTIES OF LIQUIDS" filed on Oct. 10, 2019, which claims priority to Indian provisional patent application no. 201841043175 dated Nov. 16, 2018 entitled "DEVICE AND METHOD OF SENSING MULTIPLE PROPERTIES OF LIQUIDS", and the complete specification thereof, filed on Mar. 15, 2019, entitled DEVICES AND METHODS OF SENSING PROPERTIES OF FLUIDS.

FIELD OF THE INVENTION

The disclosure relates generally to measuring devices and in particular to devices and methods for measuring properties of liquids using ultrasound sensing.

DESCRIPTION OF THE RELATED ART

Acoustic waveguides are used to measure the physical properties (e.g., density, viscosity, level, temperature, etc.) of a fluid flowing or stored in a conduit or vessel. In a typical acoustic waveguide, a transducer assembly launches an acoustic pulse from one end of the waveguide located outside of a sealed conduit while its major portion is submersed into the fluid inside the conduit. The acoustic wave pulse is propagated in either the fundamental flexural, longitudinal or torsional mode along the length of the waveguide. When the wave group contacts the end of the waveguide, or with any cross-sectional change in the waveguide, it is reflected backwards towards the transducer. The transducer receives the reflected wave group and transmits it for further analysis. The speed of the acoustic pulse in the section of the waveguide submersed into the fluid depends on the physical properties of the fluid and therefore can be used to determine those properties.

Prior art methods measure physical properties of fluids based on noise wave propagation in either one or two fundamental modes in a waveguide. One of the major drawbacks of these techniques is the weak reflection of the wave pulse from the tube's end cut resulting in difficulties in result interpretation. There is therefore a need for improvising the propagation of acoustic waves in a waveguide to obtain accurate measurements by improving the robustness of the reflected wave signal. Apart from these, the wave mode signals are processed individually which leads to increase in time for the extraction of information from those signals.

US patent application US20180113030A1 proposes a waveguide with distributed sensors that support travelling of ultrasonic wave modes and provide sensing of the physical and chemical properties of the medium surrounding the sensor locations. A method to determine a location of a fluid layer is disclosed in US granted patent U.S. Pat. No. 9,343,055B2 in which an acoustic wave is propagated through the acoustic waveguide and the echoes of the acoustic wave reflected by the waveguide reflectors provides the location of the fluid layer. A method of detecting the level of an aerated fluid is disclosed in US granted patent U.S. Pat. No. 9,285,261B2. US patent application US20160153938A1 discloses a method and a system for measuring mechanical properties of a solid material using standard ultrasonic wave modes. Prior art methods do not measure the properties of fluid accurately within a shorter duration of time. The invention discloses a method for measuring the properties of fluid that overcomes some of the drawbacks of existing methods.

SUMMARY OF THE INVENTION

In various embodiments, provided herein is a method of simultaneously measuring various properties of a fluid using a waveguide having a first end and a second end and a body of substantially uniform cross section therebetween. At least one transducer is affixed to the first end of the waveguide and configured to send acoustic waves and to receive reflected acoustic signals. The method comprises transmitting a plurality of wave modes into the fluid using an ultrasonic shear wave transducer from the first end of a waveguide and receiving the reflected plurality of wave modes from the second end of the waveguide. The reflections may contain information characteristic of the properties of the fluid. Then the plurality of received wave modes are processed simultaneously to determine time of flight and amplitude ratio of the received wave modes. Thereby one or more properties of the fluid are measured using the determined time of flight and amplitude of the received wave modes.

In various embodiments the plurality of wave modes are selected from longitudinal (L(m,n)), torsional (T(m,n), or flexural (F(m,n)). In some embodiments the transmitting is done at an angle of 45-90° inclination to an axis of the waveguide.

In some embodiments the one or more properties measured may include viscosity, density, flow rate, level or temperature of the fluid. In some embodiments the properties of the fluid are measured using at least two wave modes.

In some embodiments the method comprises measuring a first property of the fluid, measuring a second property of the fluid and applying a correction to the first property using the second property measurement. In some embodiments the first property is fluid level and the second property is density, viscosity or temperature of the fluid. In one embodiment the fluid level is measured to an accuracy of 2.5% or better in the range 10-100 mm.

In various embodiments of the method the second end is provided with an axisymmetric notch, a non-axisymmetric notch, a bend, a polygonal section, or an elliptical section. In various embodiments the method may include measuring the density or viscosity using flexural wave mode, torsional wave mode or both.

In some embodiments the property measured is density and the second end comprises an elliptical section. In some embodiments the property measured is fluid level and the second end comprises a cylindrical or a flat section. In some embodiments the property measured is flow rate and the second end comprises a cylindrical section.

In some embodiments the fluid properties are measured using at least two different frequencies.

This and other aspects are disclosed herein.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

Figure 1A:
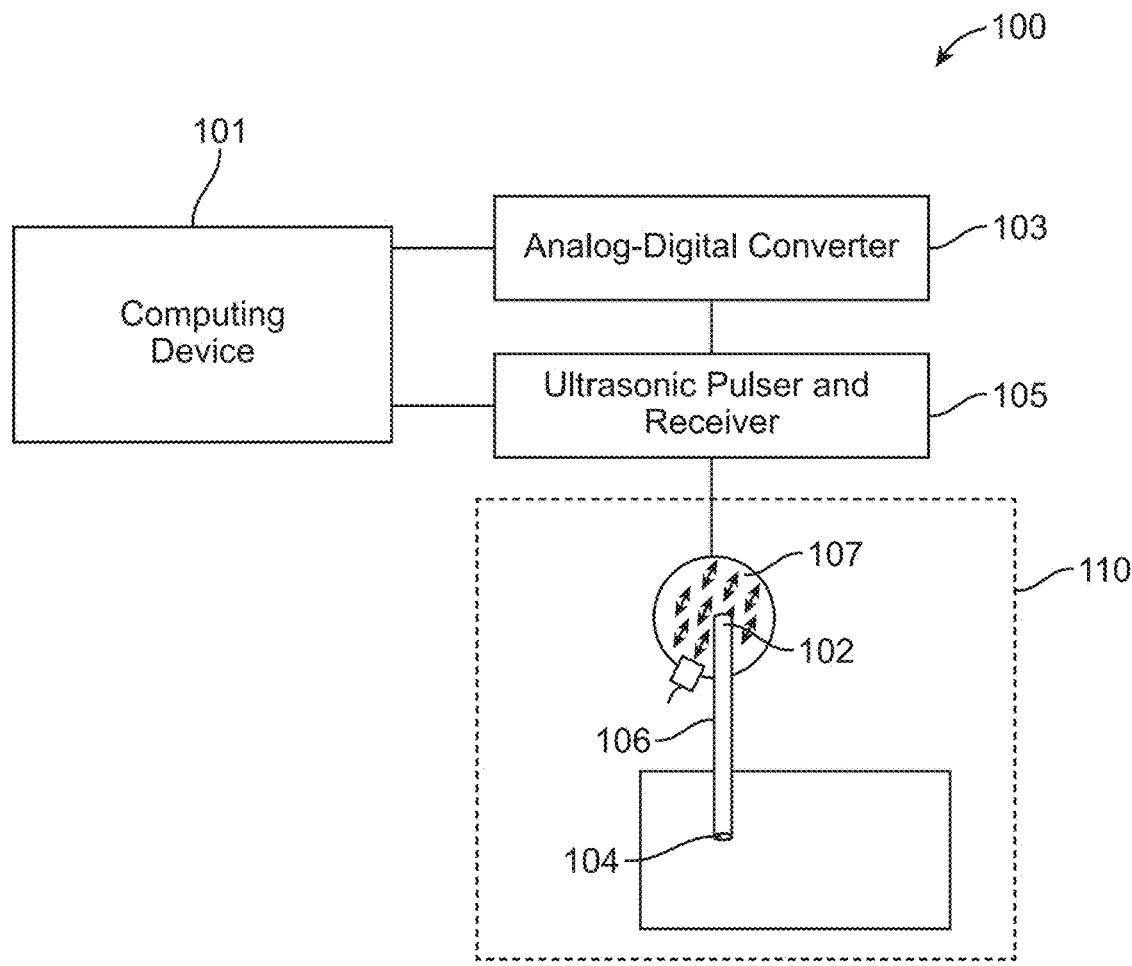
FIG. 1A illustrates a system for measuring the properties of fluid.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The invention in its various embodiments discloses a system and a method for simultaneously measuring various properties of a fluid using a waveguide. The disclosed method is used to measure the properties of a fluid accurately in a short period of time.

In various embodiments, provided herein are systems and methods for simultaneously measuring various properties of a fluid. The system 100 as shown in FIG. 1A includes a computing device 101, an analog to digital converter 103, an ultrasonic pulser-receiver 105 and a waveguide sensor device 110. The computing device 101 is configured for data acquisition, processing and calculation of properties of fluid. The analog to digital converter 103 is configured to convert the analog signal to digital signal. The ultrasonic pulser-receiver 105 is configured to generate electric pulses. The pulses generated by pulser-receiver 105 are sent to the device 110. The device 110 includes a first end 102, a body 106 and a second end 104. The body 106 has substantially uniform cross section. The cross section in some embodiments may be circular, square, polygonal or other section. The device 110 includes at least one transducer 107 affixed to the first end 102 of the waveguide. The transducer 107 is configured to convert the electric pulses into acoustic pulses. The transducer 107 is configured to send acoustic waves and to receive reflected acoustic signals.

Figure 1B:
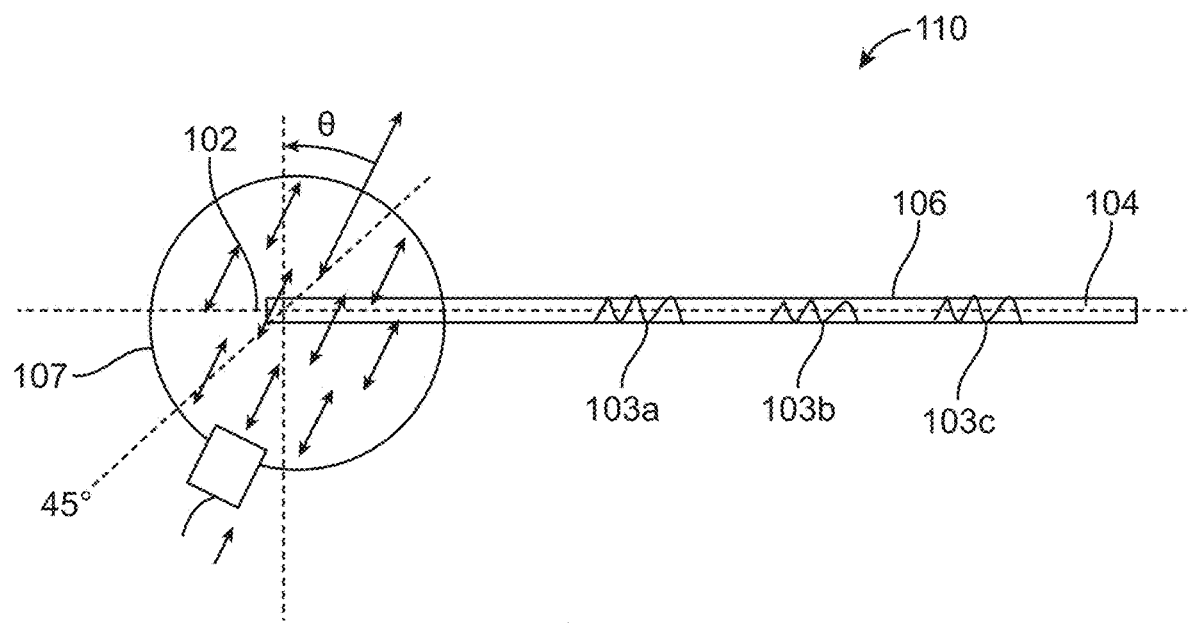
FIG. 1B illustrates a configuration of shear transducer with respect to the waveguide.

In one embodiment, the measurement device 110 may have a shear wave transducer 107 oriented at an angle $\theta$ to the axis of the waveguide, as shown in FIG. 1B. In various embodiments, the angle $\theta$ may vary between 45-90 degrees with reference to the axis of the waveguide. In various embodiments, the transducer is configured to produce waveforms 103a corresponding to longitudinal L(0,1), 103b corresponding to torsional T(0,1), or flexural F(1,1) modes of vibration simultaneously.

Figure 1C:
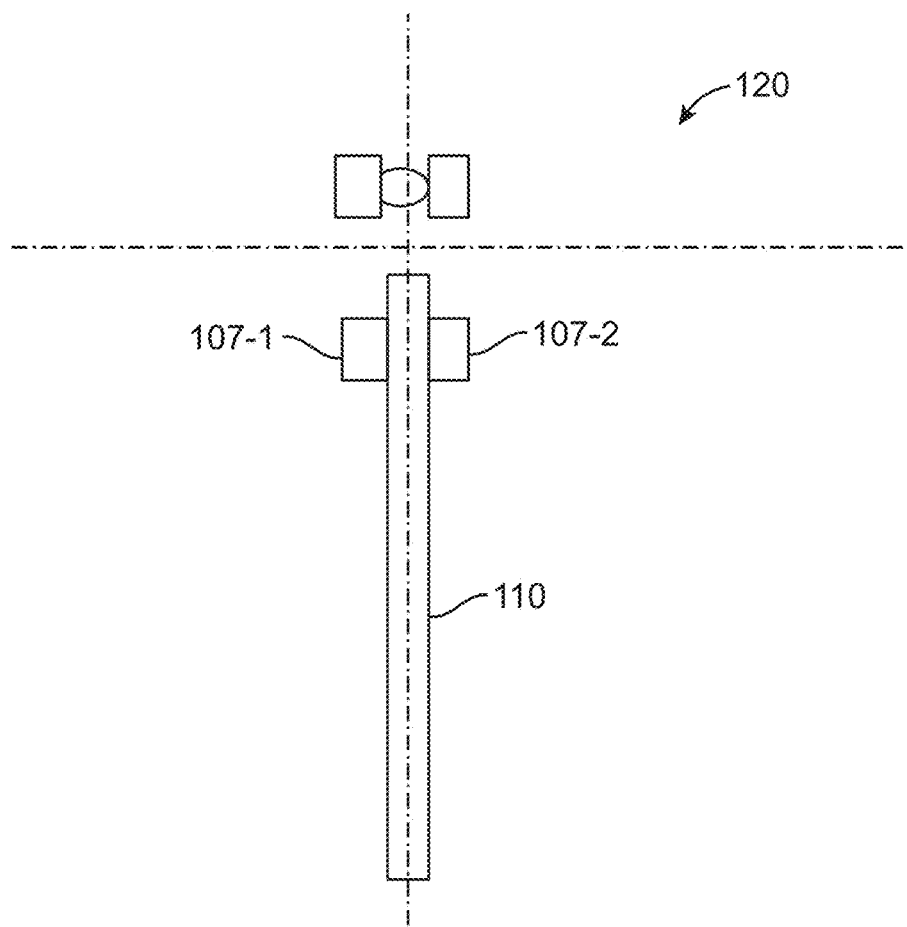
FIG. 1C illustrates a waveguide with an excitation transducer and a reception transducer.
Figure 1D:
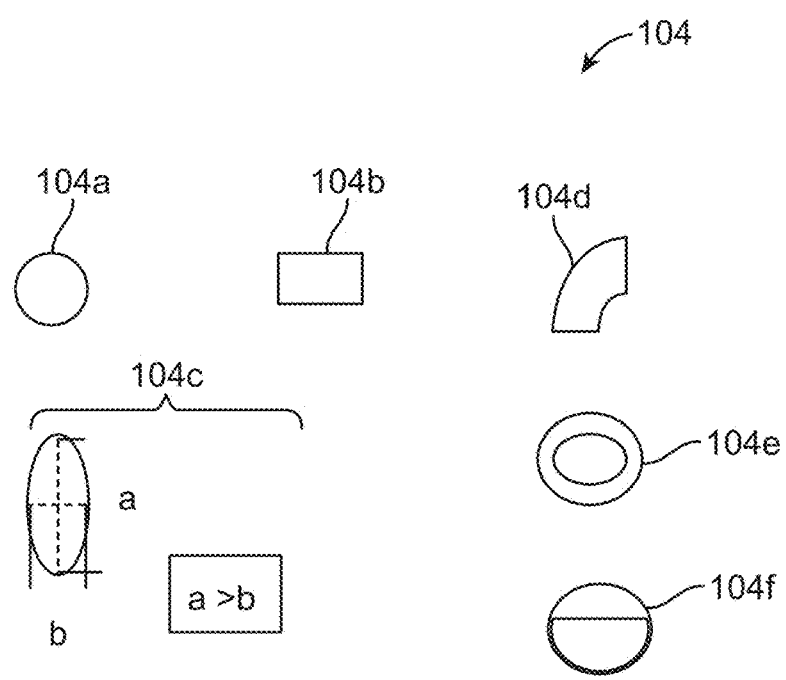
FIG. 1D shows the changes in the cross-section of second end of the waveguide.

In one embodiment, device 120 includes one excitation transducer 107-1 and one reception transducer 107-2 as shown in FIG. 1C. In some embodiments, the device 110 includes more than one transducer for transmitting or receiving the signals in more than one frequency zone or wave mode. The zones may include low attenuation, increasing attenuation and high attenuation zones. The second end 104 of the device 110 in some embodiments is provided with a change in cross section. In various embodiments, the change in cross-section may include a circular section 104a, a flat or polygonal section 104b, an elliptical section 104c, a bend 104d, axisymmetric notch 104e, or a non-axisymmetric notch 104f, as shown in FIG. 1D. In some embodiments a waveguide with circular cross section and with unchanged cross section at the second end may be used. In some embodiments, the waveguide may have a circular cross section with non-circular second end.

Figure 2:
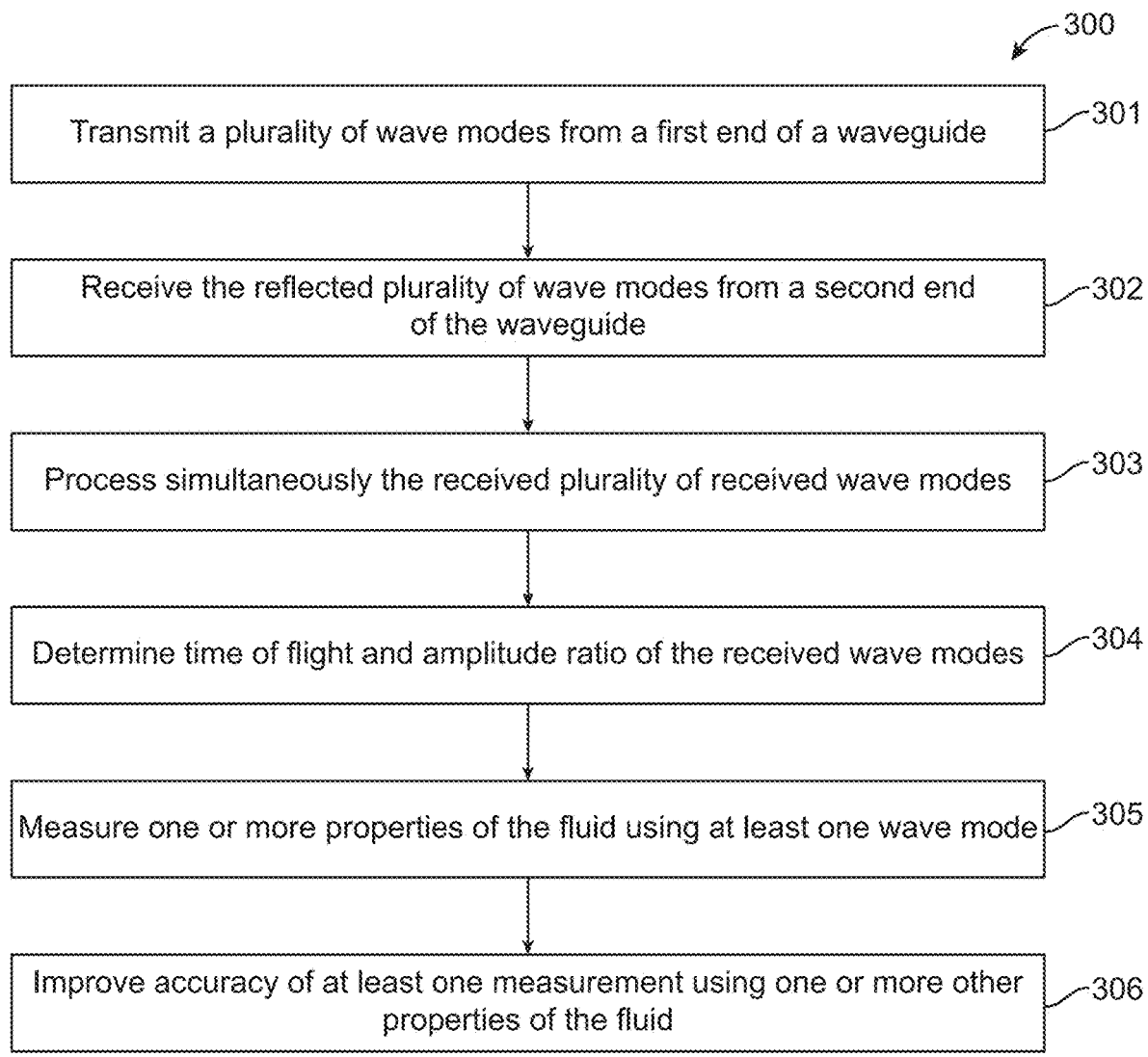
FIG. 2 illustrates a method for measuring the properties of fluid.

In various embodiments, the method 200 for simultaneously measuring various properties of a fluid, as shown in FIG. 2 includes the steps of transmitting a plurality of wave modes into the fluid using an ultrasonic shear wave transducer from the first end of a waveguide in step 201. In some embodiments, the plurality of wave modes are selected from longitudinal (L(m,n)), torsional (T(m,n)), or flexural (F(m,n)) modes. In step 202, the reflected plurality of wave modes are received from the second end of the waveguide. The reflections contain information characteristic of the properties of the fluid. The plurality of received wave modes are processed simultaneously in step 203. In step 204, time of flight and amplitude ratio of the received wave modes are determined. In step 205, one or more properties of the fluid are measured using determined time of flight and amplitude of the received wave modes. In various embodiments, the properties of the fluid are measured simultaneously using at least two wave modes. In some embodiments, the measured one or more properties of the fluid includes viscosity, density, flow rate, level or temperature of the fluid.

In some embodiments, the method 200 may involve measuring a first property of a fluid such as level, flow etc. and a second property such as temperature, density etc. The method may further involve applying a correction to the first property using the second property. In one embodiment, the simultaneous measurements performed using the method 200 may be fluid level and temperature, and the method may involve correcting the fluid level measurement using density, viscosity or temperature of the fluid. Temperature may be measured by a temperature dependent parameter such as density or viscosity. In one embodiment, the measurement error is less than or equal to 2.5% when measuring change in level between 10-100 mm.

In some embodiments, the method 200 in step 201 includes transmitting the wave modes at an angle θ of 45-90° inclination to an axis of the waveguide. In another embodiment, the transmitting is done at an angle of 90° and the property measured is a level of fluid.

In some embodiments, the density and viscosity are measured using flexural wave and torsional wave modes. In one embodiment, the flow rate is measured using longitudinal wave mode and the fluid level is measured using flexural wave mode. In various embodiments the temperature of a fluid may be measured using density or viscosity as primary measurement.

In some embodiments the method 200 may be used to measure flow rate. The waveguide may be employed for flow measurement using the same experimental setup as shown in FIG. 1A. In some embodiments a circular waveguide with circular end may be used and the second end of the waveguide may be placed in the flowing fluid. The tranducer orientation may be 45° to the axis of the waveguide to generate all three L, T and F wave modes. The method may further involve detecting drop in amplitude of the reflected signals, in all three wave modes shift in TOF in F(1,1) with increasing flow rate. The method may detect flow rate with error of 2% or less.

The methods disclosed here may be used to measure the physical properties of fluids. The disclosed methods may also be used to determine gradients in the properties of the fluid. The distributed physical properties of fluid may also be determined using the methods. Further, the methods disclosed here provide redundancy to improve accuracy in measurements of the fluid level/rheology. The methods have wide applications for example, inside critical enclosures of processing industries where access to other types of sensors is difficult.

EXAMPLES

Example 1

Method for Measuring Fluid Level

Figure 3:
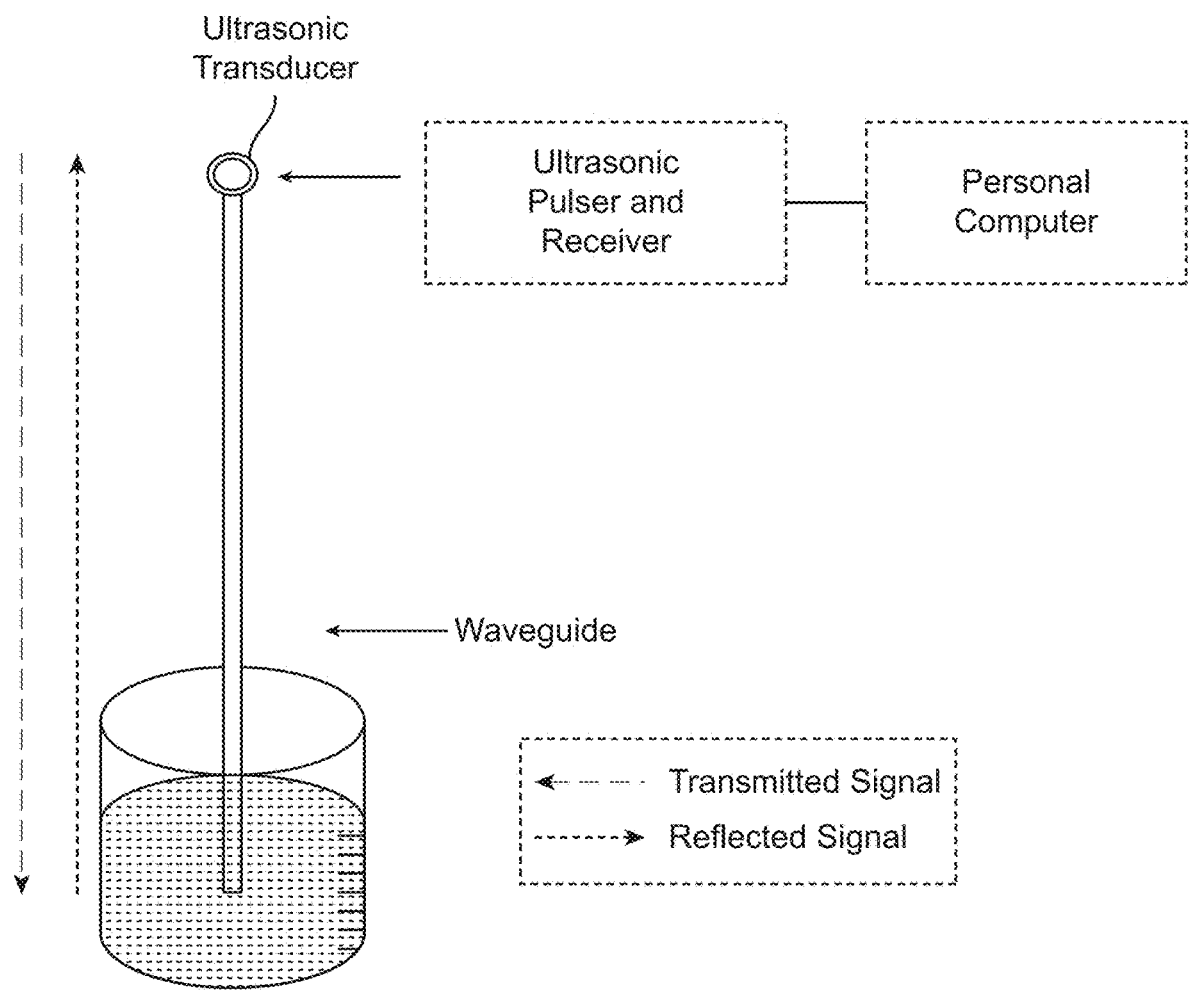
FIG. 3 shows the schematic of the experimental setup for fluid property measurement using a waveguide sensor.
Figure 4A:
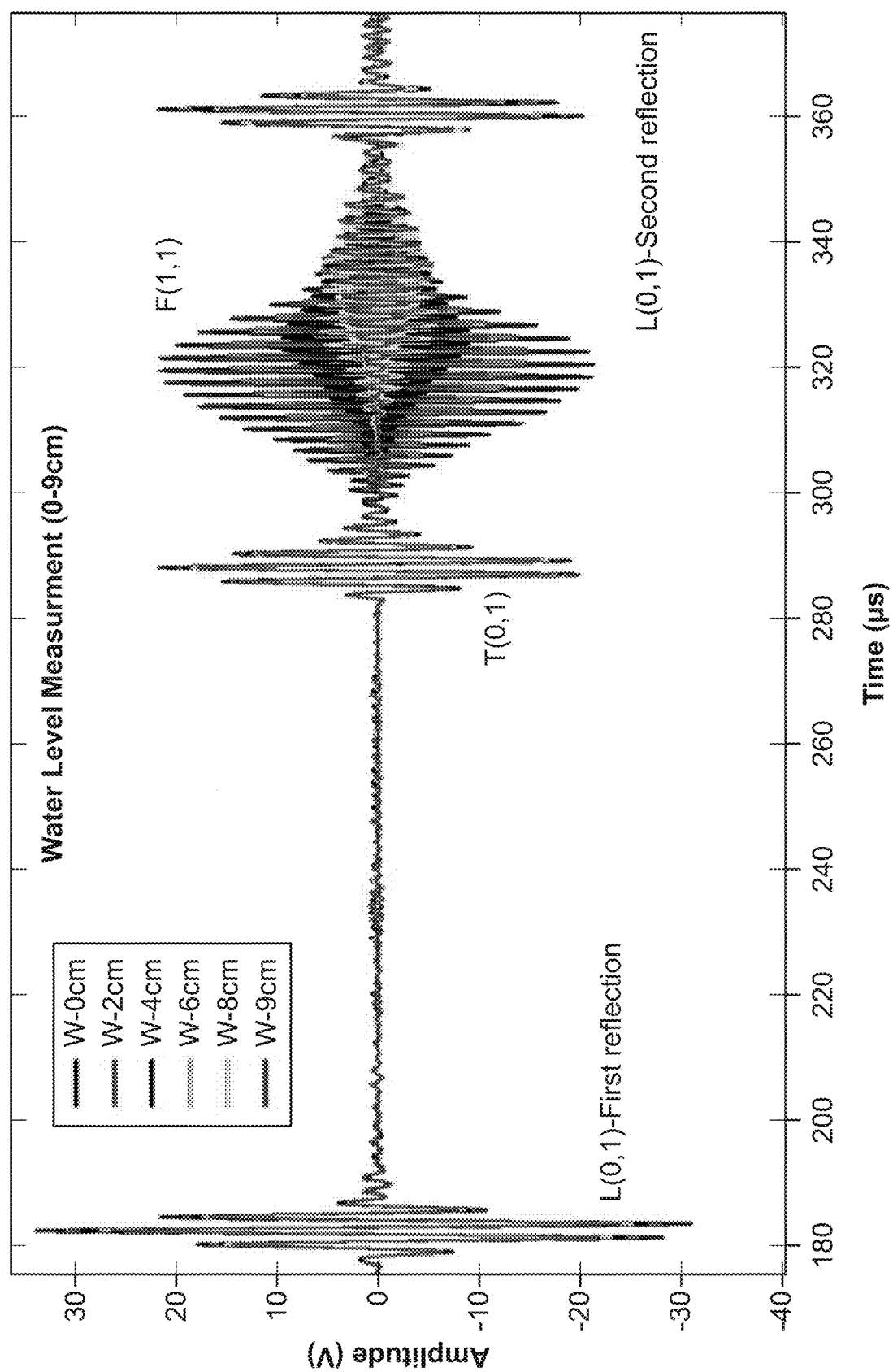
FIGS. 4A, and 4B show reflected A-scan signals in L(0,1), T(0,1) and F(1,1) modes at different fluid levels.
Figure 4B:
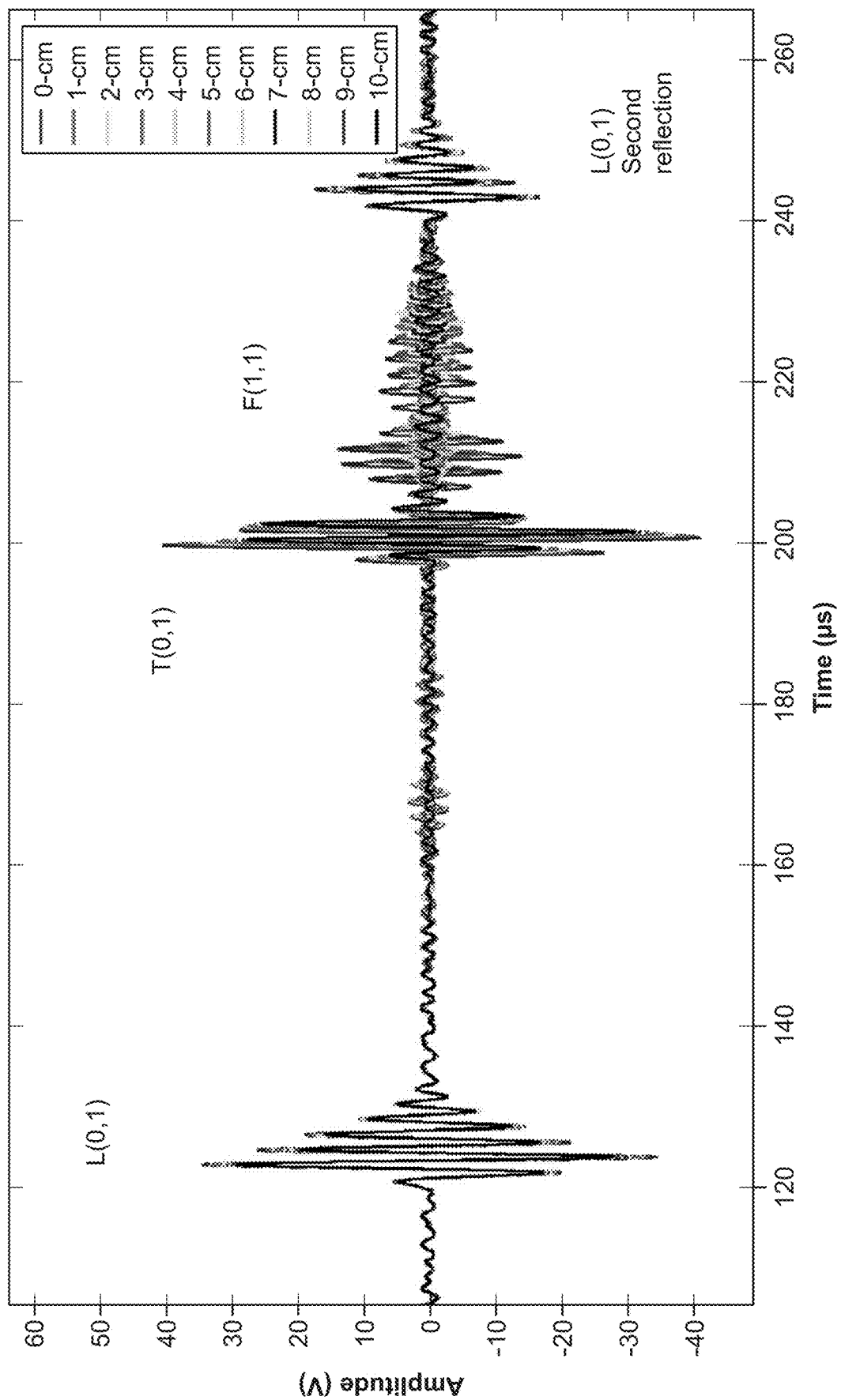

The experiment was conducted for the determination of fluid level in (a) water and (b) castor oil using thin wire like waveguide sensor. The cross section was uniformly cylindrical without a change in cross section at the end. The schematic of the experimental setup is shown in FIG. 3. Initially, the A-scan signal was obtained for air medium or zero water level (0-cm) as shown in FIG. 4A. Subsequently, the fluid (water) was filled gently in the cylindrical container at increments of 10 mm. The A-scan signals were acquired at each 10 mm interval while filling 90 mm depth of water in the test container are shown in FIG. 4B.

Figure 5A:
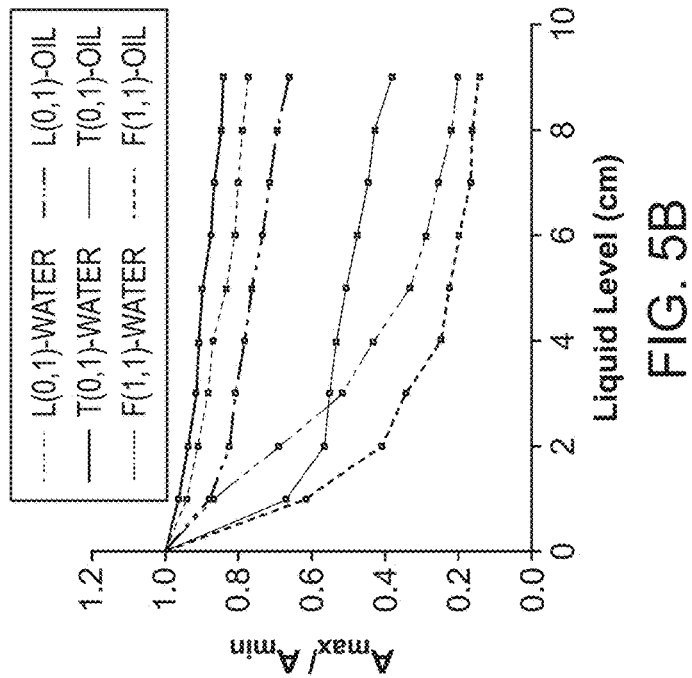
FIG. 5A shows the change in time of flight ($\delta$TOF) of the L(0,1), T(0,1) and F(1,1) wave modes at different fluid levels.
Figure 5B:
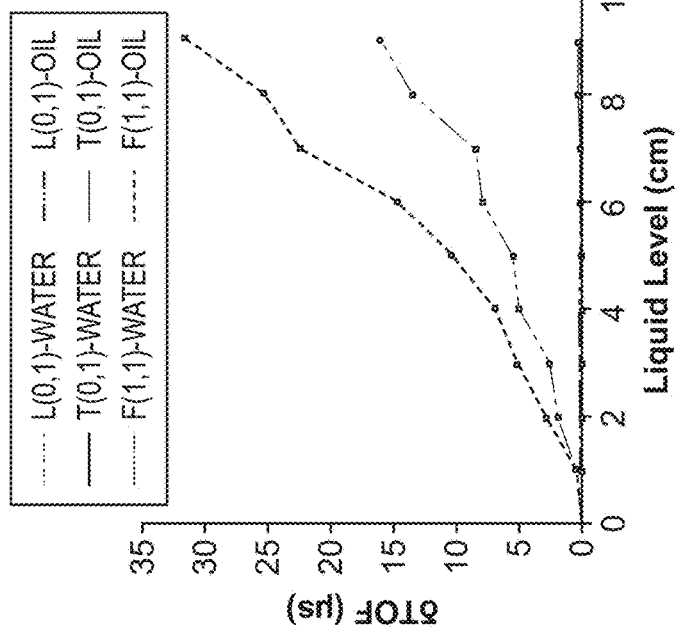
FIG. 5B shows the change in peak amplitude of the L(0,1), T(0,1) and F(1,1) wave modes at different fluid levels.

The sensor was placed inside a beaker and corresponding level scale were used for verification of level measurement. The change in δTOF's and amplitude for the L(0,1), T(0,1) and F(1,1) wave modes at different fluid levels are shown in FIG. 5A and FIG. 5B respectively. As shown in FIG. 5A, due to the dispersive nature of the F(1,1) mode, the δTOF's values are relatively higher in flexural wave mode as compared to the torsional and longitudinal wave modes. The time of flight indicates the fluid level. As shown in FIG. 5A, the time of flight is proportional to the fluid level. As shown in FIG. 5B, the amplitude ratio of flexural wave mode decreases with increase in fluid level. There is no substantial drop in the amplitude ratio of torsional and longitudinal wave mode, when the fluid to be measured is water whereas there is significant drop in the amplitude ratio of torsional and longitudinal wave mode, when the fluid to be measured is oil.

Figure 5C:
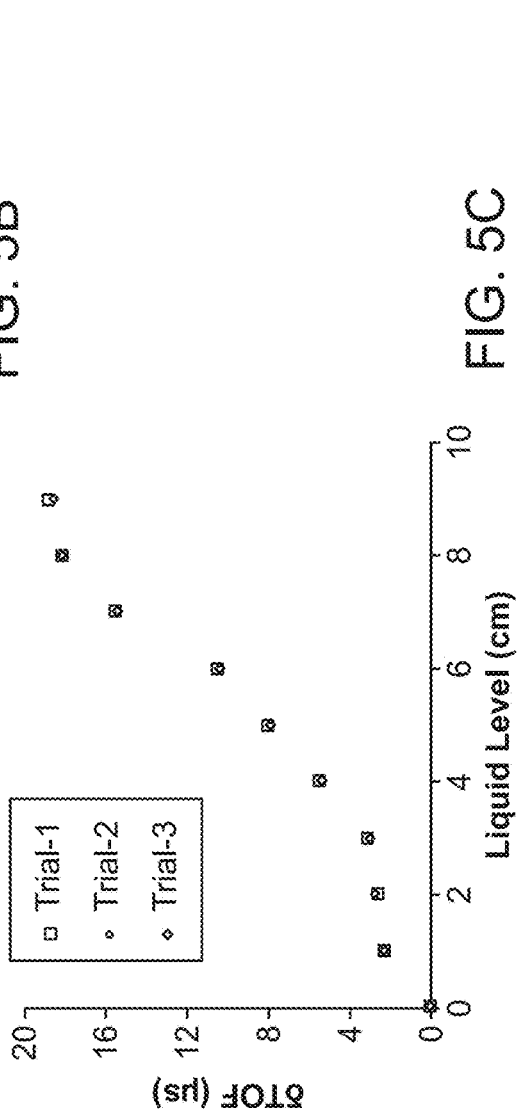
FIG. 5C shows validation of liquid level measurement in the 10-100 mm range, illustrating error<2.5%.

Multiple trials were conducted to validate the repeatability of this technique. The level Measurement experiments were repeated for non-viscous fluid and the obtained shift in peak frequency and δTOF at different fluid levels of F(1,1) are shown in FIG. 5C. The data of FIG. 5C was found to be consistent and repeatable with an error percentage less than 2.5%.

It was observed that the flexural wave mode F(1,1) was much more sensitive to the surrounding fluid as compared to the longitudinal L(0,1) and torsional T(0,1) wave modes on viscous and non-viscous fluids. L(0,1) is much more sensitive in water (non-viscous) level measurement compared to T(0,1), while T(0,1) is much more sensitive in oil (viscous) level measurement compared to L(0,1).

Example 2

Measurement of Density

Figure 6A:
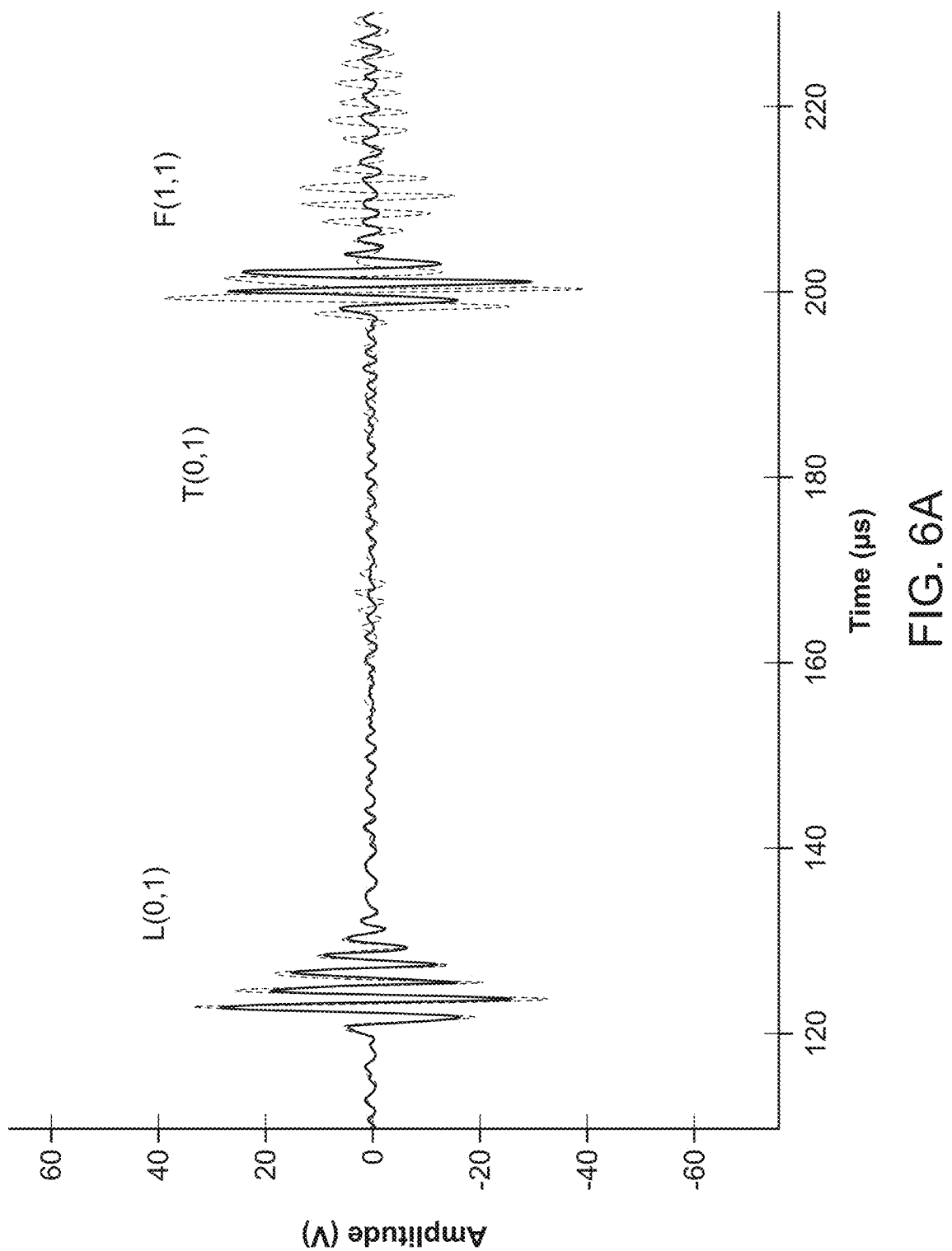
FIG. 6A shows the reflected L(0,1), T(0,1) and F(1,1) modes in the A-scan signals observed at different fluid densities.
Figure 6B:
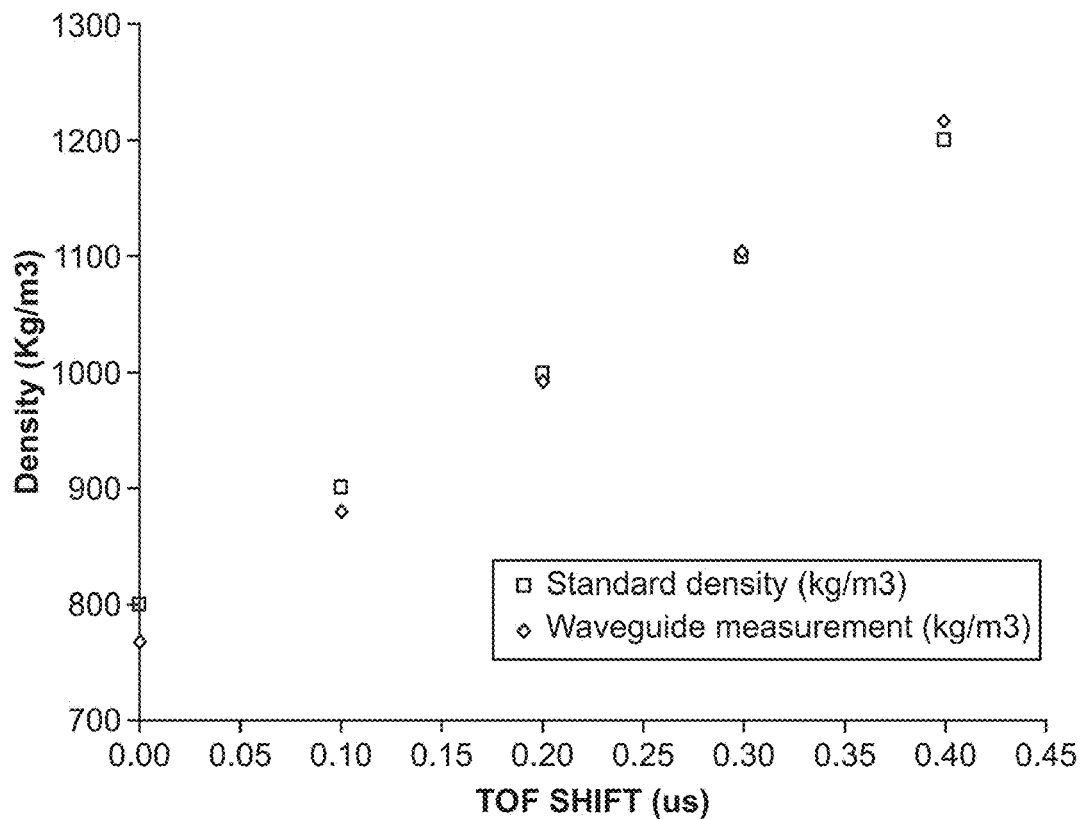
FIG. 6B shows comparison between standard and measured values of fluid densities using shift in TOF.

For measuring density, the experimental setup as shown in FIG. 3 was used to transmit/receive the signal, and temperature was recorded with a thermocouple. The obtained A-scan signals are shown in FIG. 6A. This experiment was chosen to validate the inverse model for density prediction. An circular waveguide with non-circular elliptical end was used. Fluid samples with density from 800 kg/m$^3$ (kerosene) to 1200 kg/m$^3$ were used. Above 1000 kg/m$^3$, the density variation was achieved by adding salt to water. The centre frequency of the tone burst signal was selected to be 500 kHz. The effect of density was measured by tracking the change in TOF of T(0,1) (i.e TOF changes with density changes) and temperature effects were tracked by monitoring the change in TOF of L(0,1) signal. The waveguide measured density values were compared with the standard values as shown in FIG. 6B. Based on the results the waveguide measurement are closely in agreement with the standard value Example 3

Measurement of Viscosity

Figure 7:
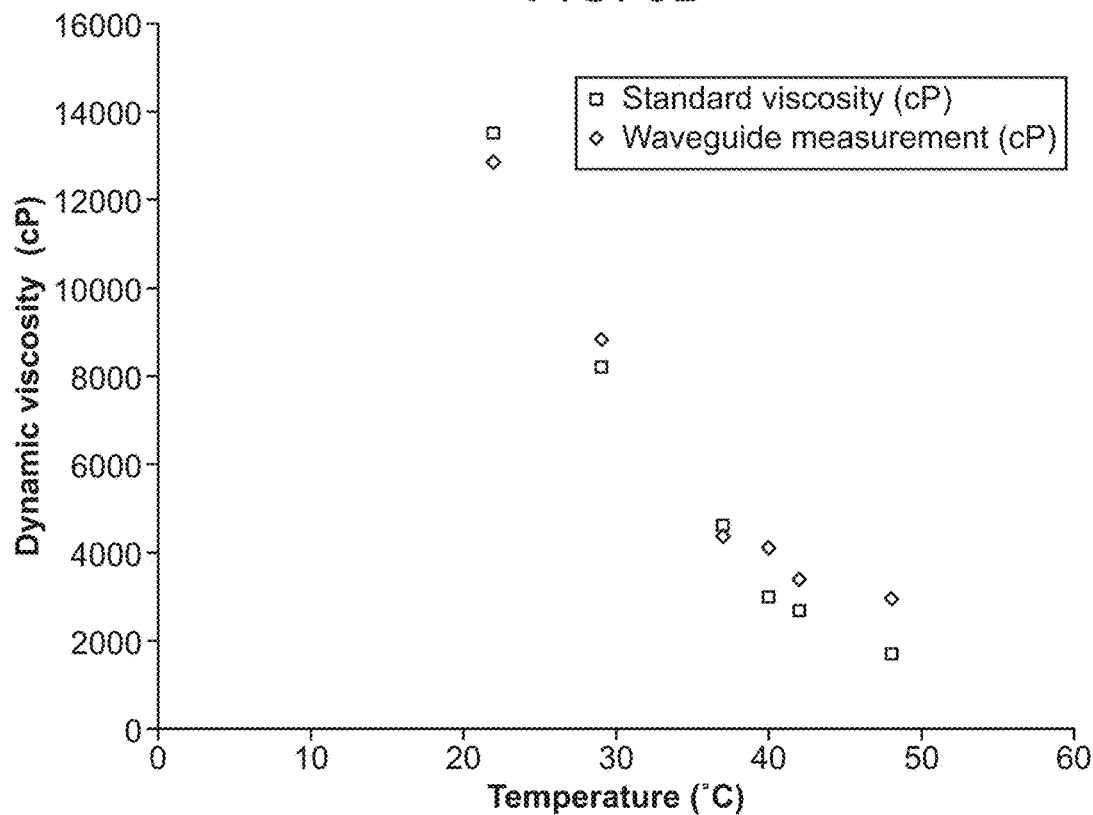
FIG. 7 shows viscosity measurements using ultrasonic method compared to Cannon standard values at different temperatures.

For measuring viscosity, the same equipment as in FIG. 3 was used, with thermocouple for temperature measurement. Experiments were carried out using F(1,1) wave mode on Cannon viscosity standards from room temperature to 48° C. The dynamic viscosity was measured using a uniformly cylindrical waveguide and compared with the standard values. The effect of viscosity was measured by tracking the change in amplitude and also calculating the reflection coefficient of the reflected L(0,1) wave mode. Also the effect of temperature was monitored by tracking the change in TOF of the other wavemode, as shown in FIG. 7. Based on the results it was observed that the waveguide measurement are closely in agreement with the standard values.

Example 4

Intrusive Flow Measurement

Figure 8A:
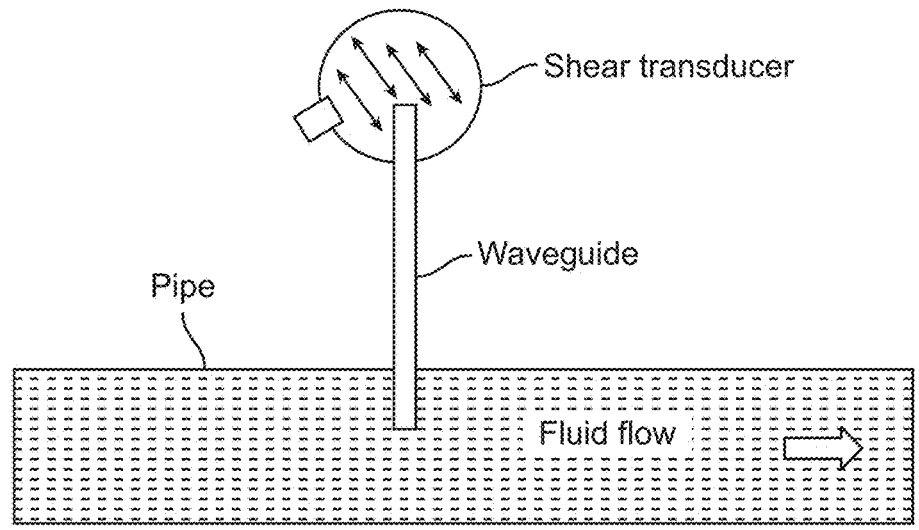
FIG. 8A shows experimental setup for intrusive flow measurement.
Figure 8B:
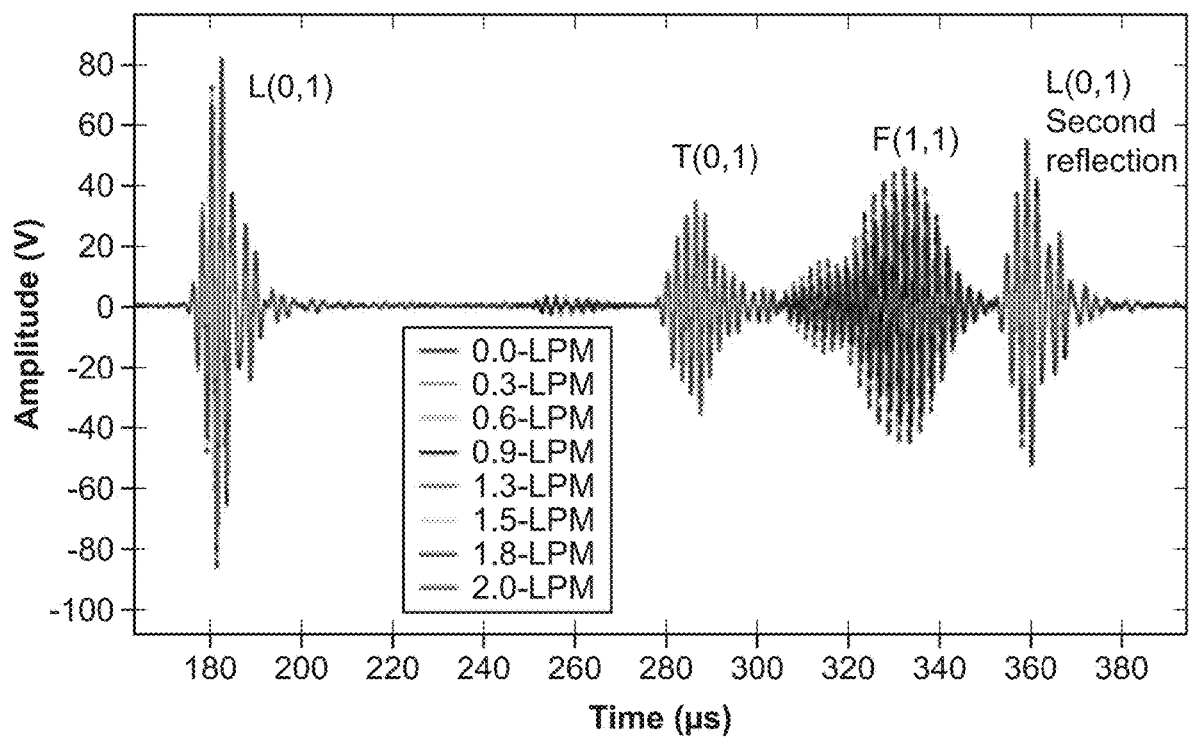
FIG. 8B shows L(0,1), T(0,1) and F(1,1) wave modes in A scan for intrusive flow measurement.
Figure 8C:
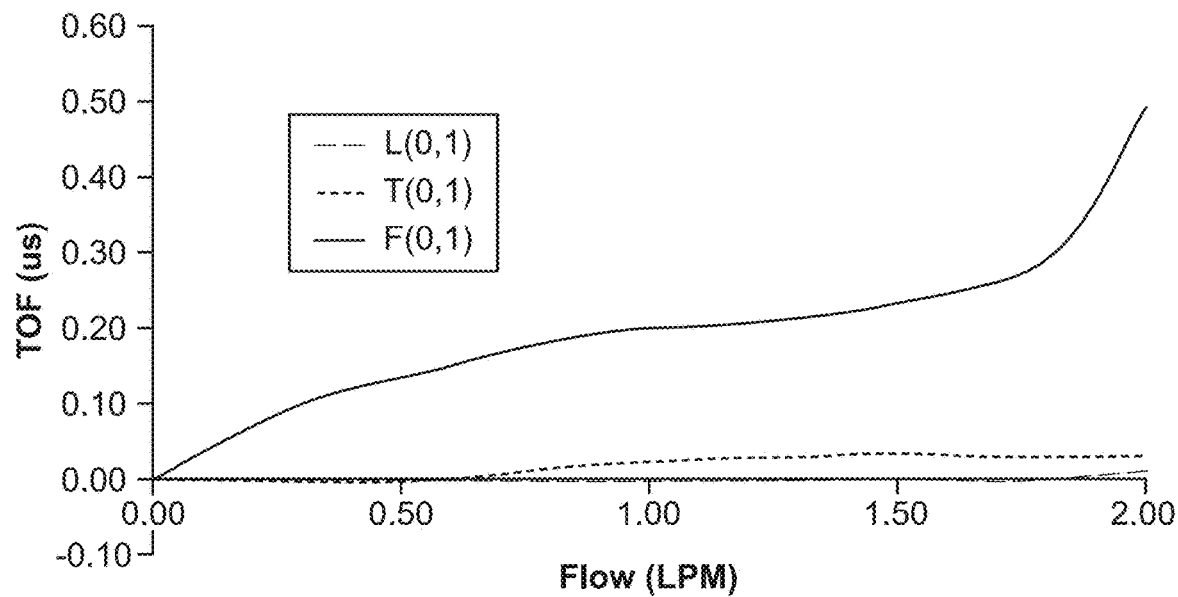
FIG. 8C shows variation in TOF with flow rate for L, T and F modes.
Figure 8D:
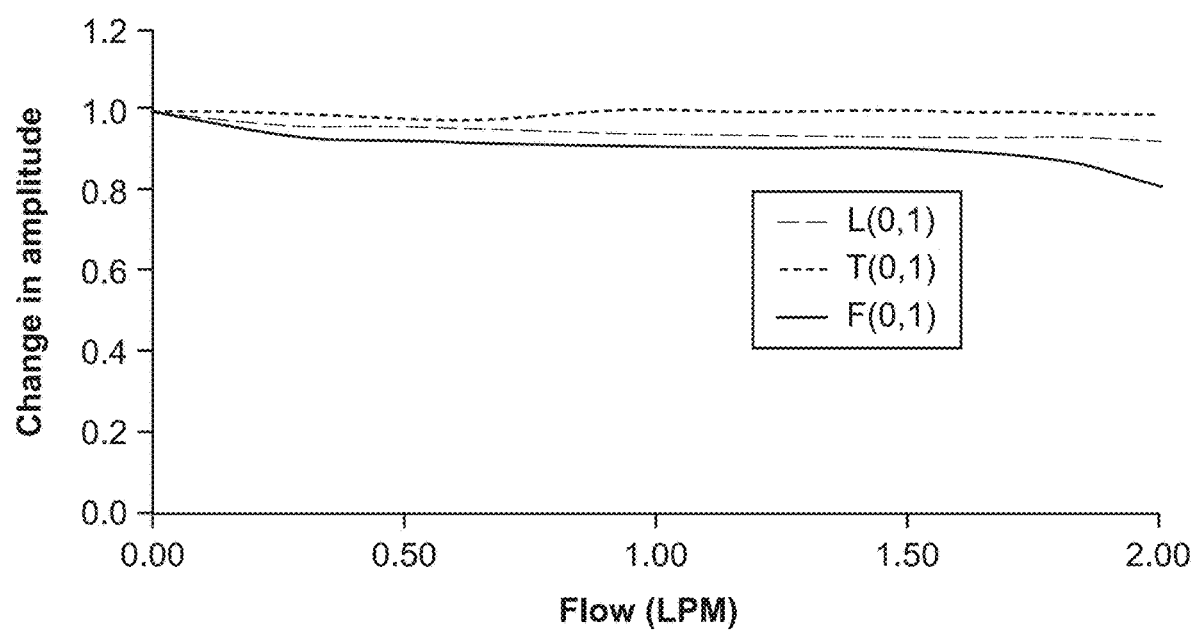
FIG. 8D shows change in amplitude with flow rate for L, T and F modes.
Figure 8E:
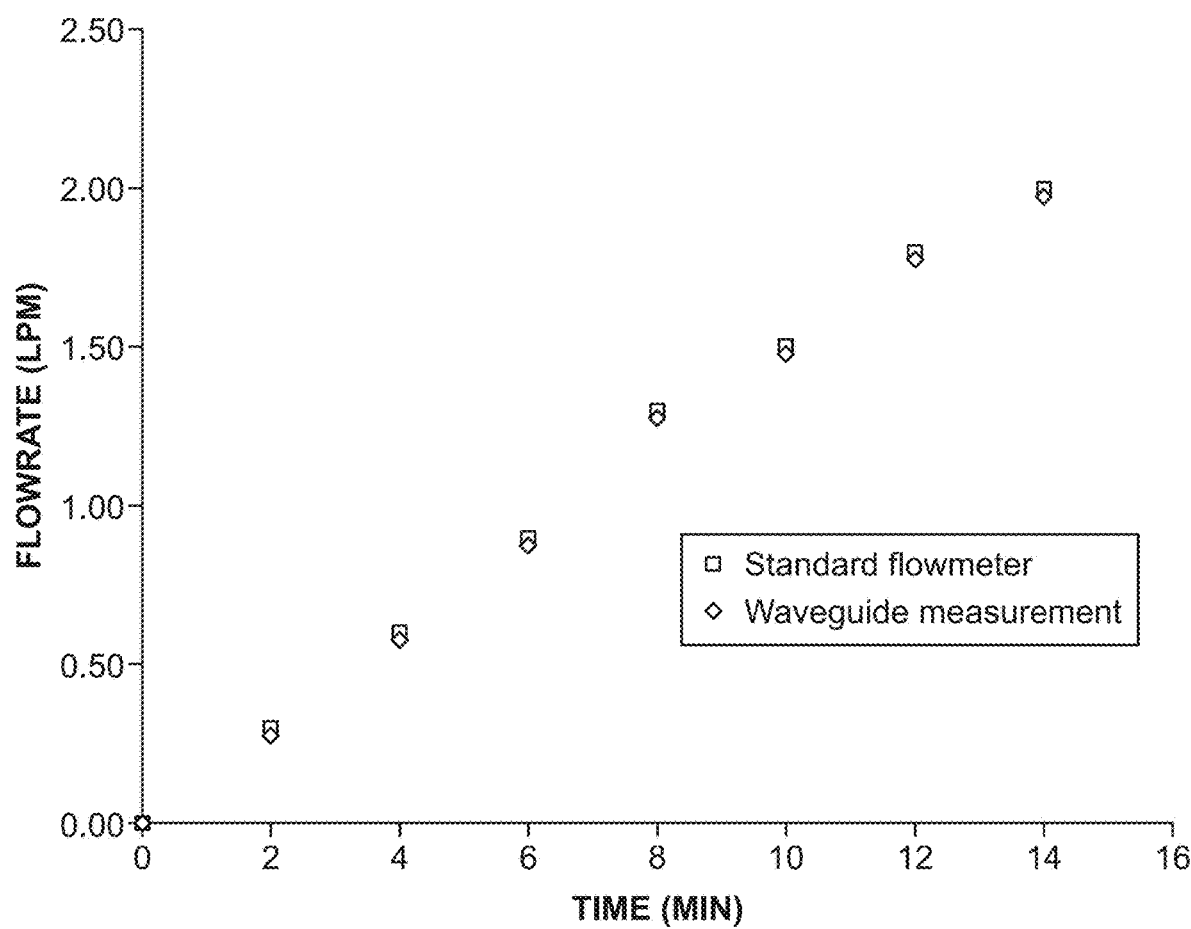
FIG. 8E shows comparison between standard rotameter measurements and ultrasonic measurements using waveguide for different flow rates.

The waveguide was employed for flow measurement using the same experimental setup as shown in FIG. 8A. A circular waveguide with circular end was selected for this experiment and the waveguide was placed inside the pipeline. The tranducer was oriented at 45° to the axis of the waveguide to generate all three wave modes. The centre frequency of the tone burst signal was 500 kHz. The flow was gradually varied in the range 0-2 LPM and the flow was measured using a rotameter. The obtained A-scan signals are shown in FIG. 8B. Significant drop in amplitude of the reflected signals in all three wave modes and shift in TOF is observed in F(1,1) wave mode compared to L(0,1) and T(0,1), with increasing flow rate, as illustrated in FIGS. 8C and 8D. The comparison of rotameter vs. waveguide measurement shows that the waveguide measurements are closely in agreement with the standard values.

We claim:

1. A method of measuring various properties of a fluid using a waveguide having a first end and a second end and a body of substantially uniform cross section therebetween, at least one transducer affixed to the first end of the waveguide configured to send acoustic waves and to receive reflected acoustic signals, comprising:
   a. transmitting a plurality of wave modes into the fluid using an ultrasonic shear wave transducer from the first end of a waveguide;
   b. receiving the reflected plurality of wave modes from the second end of the waveguide, wherein the plurality of wave modes are selected from longitudinal (L(m,n)), torsional (T(m,n), and flexural (F(m,n)), and the reflections contain information characteristic of the properties of the fluid;
   c. processing simultaneously the plurality of received wave modes;
   d. determining time of flight, peak frequency, energy and amplitude ratio of the received wave modes; and
   e. measuring one or more properties of the fluid using determined time of flight, peak frequency/energy and amplitude of the received wave modes, wherein the measuring comprises measuring the properties of the fluid using at least two wave modes, and the method comprises measuring a first property of the fluid, measuring a second property of the fluid and applying a correction to the first property using the second property measurement.

2. The method as claimed in claim 1, wherein the transmitting is done at an angle of 45-90° inclination to an axis of the waveguide to generate two or three wave modes simultaneously.

3. The method as claimed in claim 1, wherein the one or more properties measured include viscosity, density, flow rate, level or temperature of the fluid.

4. The method as claimed in claim 3, wherein the method comprises measuring the density using flexural wave mode.

5. The method as claimed in claim 3, wherein the method comprises measuring the viscosity using longitudinal wave mode.

6. The method as claimed in claim 1, wherein the first property is fluid level measured using F(1,1) mode, and the second property is density, viscosity or temperature of the fluid.

7. The method as claimed in claim 6, wherein the fluid is water and the fluid level is measured to an accuracy of 2.5% or better in the range 10-100 mm.

8. The method as claimed in claim 1, wherein the second end is provided with an axisymmetric notch, a non-axisymmetric notch, a bend, a polygonal section, or an elliptical section.

9. The method of claim 8, wherein the second end comprises an elliptical section and the property measured is density.

10. The method of claim 8, wherein the second end comprises a cylindrical or a flat section and the property measured is fluid level.

11. The method of claim 8, wherein the second end comprises a cylindrical section and the property measured is flow rate of the fluid using F(1,1) or L(0,1) mode, or both.

12. The method as claimed in claim 1, wherein the fluid properties are measured using at least two different frequencies.

* * * * *